(12) United States Patent
Kumar et al.

(10) Patent No.: US 12,368,683 B2
(45) Date of Patent: Jul. 22, 2025

(54) DYNAMIC CONFIGURATION OF SWITCH NETWORK PORT BANDWIDTH BASED ON SERVER PRIORITY

(71) Applicant: Dell Products L.P., Round Rock, TX (US)

(72) Inventors: Suren Kumar, Bangalore (IN); Akshita Das, Bangalore (IN); Akbar Sheriff, Salem (IN); Sajil Ck, Puducherry (IN)

(73) Assignee: Dell Products L.P., Round Rock, TX (US)

( * ) Notice: Subject to any disclaimer, the term of this patent is extended or adjusted under 35 U.S.C. 154(b) by 212 days.

(21) Appl. No.: 18/085,778

(22) Filed: Dec. 21, 2022

(65) Prior Publication Data

US 2024/0214327 A1    Jun. 27, 2024

(51) Int. Cl.
*H04L 47/70* (2022.01)
*H04L 43/16* (2022.01)

(52) U.S. Cl.
CPC .......... *H04L 47/821* (2013.01); *H04L 43/16* (2013.01)

(58) Field of Classification Search
CPC ....... H04L 47/821; H04L 43/16; H04L 47/70; H04L 47/52
USPC ........................................................ 709/226
See application file for complete search history.

(56) References Cited

U.S. PATENT DOCUMENTS

| | | | |
|---|---|---|---|
| 6,108,306 A * | 8/2000 | Kalkunte | H04L 12/5602 370/468 |
| 6,647,419 B1 | 11/2003 | Mogul | |
| 9,621,425 B2 | 4/2017 | Zhang et al. | |
| 2004/0017827 A1 * | 1/2004 | You | H04L 47/10 370/468 |
| 2008/0159321 A1 * | 7/2008 | Rispoli | G06F 13/4022 370/419 |
| 2015/0215169 A1 * | 7/2015 | Mital | H04L 41/0896 370/231 |
| 2015/0277958 A1 * | 10/2015 | Tanaka | H04L 43/0817 718/1 |
| 2015/0295762 A1 * | 10/2015 | Phillips | H04L 41/0806 709/226 |
| 2017/0147248 A1 * | 5/2017 | Chitti | G06F 3/061 |
| 2018/0183673 A1 * | 6/2018 | Iyengar | H04L 49/10 |
| 2020/0029110 A1 * | 1/2020 | Xin | H04M 3/14 |
| 2020/0163242 A1 * | 5/2020 | Leigh | H05K 7/1491 |
| 2020/0366625 A1 * | 11/2020 | Ballard | H04L 45/245 |

(Continued)

*Primary Examiner* — Christopher B Robinson
*Assistant Examiner* — Chong G Kim
(74) *Attorney, Agent, or Firm* — Larson Newman, LLP

(57) ABSTRACT

An information handling system includes processing modules and an I/O module. The processing modules each have one of a high or low priority level. The I/O module is coupled to a network device and includes network ports coupled to the processing modules. A port bandwidth control engine (PBCE) determines that the network device is providing a maximum bandwidth to the I/O module, and in response, allocates the maximum bandwidth equally to the processing modules. The PBCE further determines that the network device is providing a reduced bandwidth to the I/O module, and, in response, allocates to each high priority level processing module a first bandwidth on the associated network port and allocates to each low priority level processing module a second bandwidth on the associated network port.

20 Claims, 4 Drawing Sheets

(56) References Cited

U.S. PATENT DOCUMENTS

2021/0021473 A1\* 1/2021 Leigh .................. H04L 41/0896
2021/0345024 A1\* 11/2021 Leigh ................. H04Q 11/0005

\* cited by examiner

DYNAMIC CONFIGURATION OF SWITCH NETWORK PORT BANDWIDTH BASED ON SERVER PRIORITY

FIELD OF THE DISCLOSURE

This disclosure generally relates to information handling systems, and more particularly relates to the dynamic determination and configuration of switch network port bandwidth based on server priority.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include processing modules and an I/O module. The processing modules may each have one of a high or low priority level. The I/O module may be coupled to a network device and may include network ports coupled to the processing modules. A port bandwidth control engine (PBCE) may determine that the network device is providing a maximum bandwidth to the I/O module, and in response, may allocate the maximum bandwidth equally to the processing modules. The PBCE may further determine that the network device is providing a reduced bandwidth to the I/O module, and, in response, may allocate to each high priority level processing module a first bandwidth on the associated network port and allocate to each low priority level processing module a second bandwidth on the associated network port.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
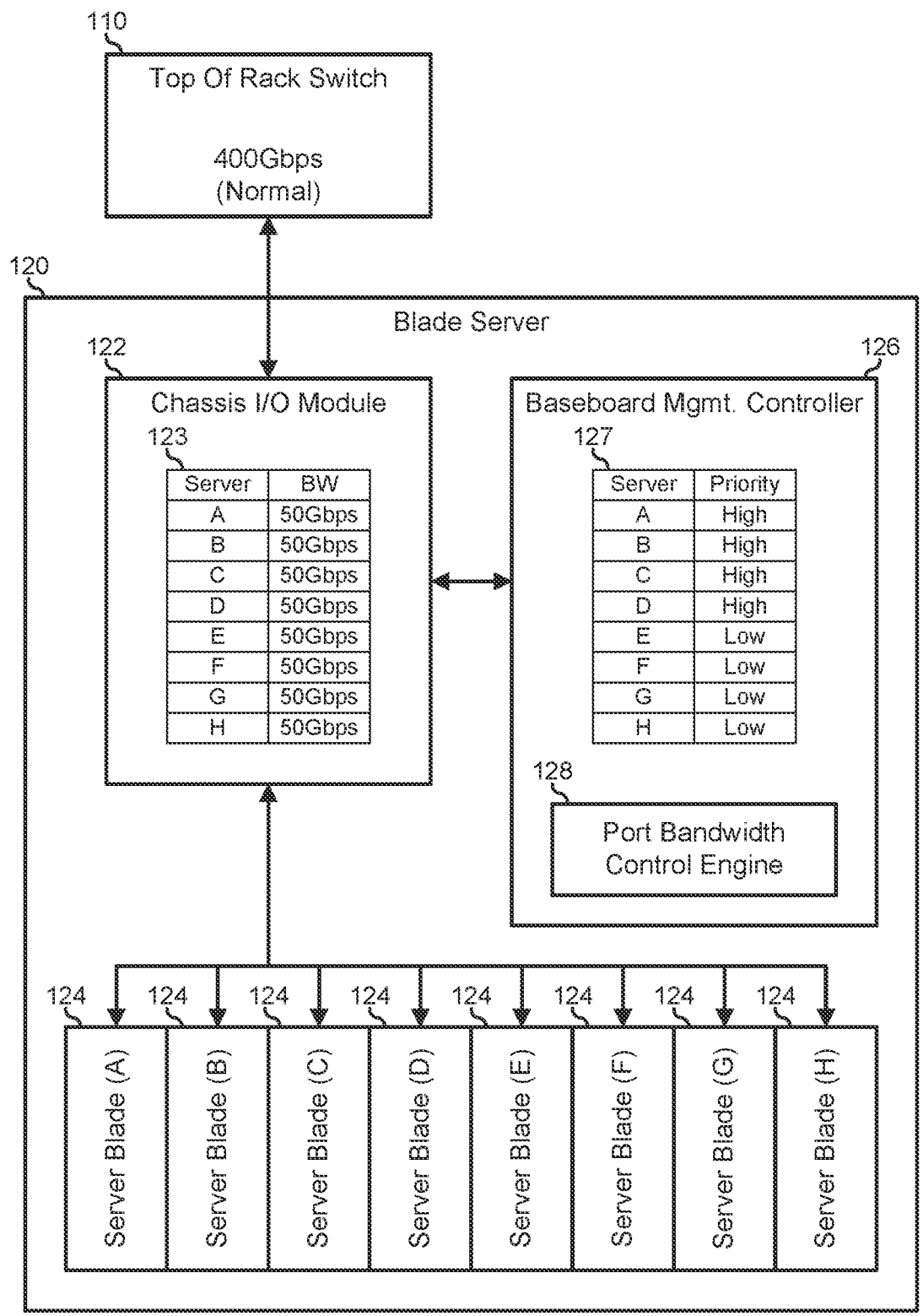
FIGS. 1 and 2 are block diagrams of an information handling system according to an embodiment of the current disclosure.

FIG. 1 illustrates an information handling system 100 including a top-of-rack (TOR) switch 110 and a blade server 120. Information handling system 100 represents an enterprise level computing system, such as may be typically provided in a server rack of a datacenter. In particular, blade server 120 represents an integrated, chassis-mounted computing device that is typically provided in a form factor suitable for mounting in a server rack, and that provides a scalable and highly configurable computing capacity for the datacenter, as needed or desired. As such, blade server 120 represents a stand-alone computing device that integrates a chassis input/output (I/O) module 122, and a number of server blades 124 (here illustrated with a typical eight (8) server blades). Server blades 124 represent the core computing functionality of blade server 120, and may be utilized for stand-alone computing applications, or for highly virtualized computing environments.

Chassis I/O module 122 provides a local network interface for blade server 120 and switching of the network traffic to the target blade servers 124. As such, chassis I/O module 122 is connected to TOR switch 110 by one or more network cables to provide blade server 120 with connectivity to the resources of a wider network of the datacenter, such as to storage nodes, other compute nodes, or the like. The network communication links between TOR switch 110 and chassis I/O module 122, and between the chassis I/O module and blade servers 124 may represent one or more physical port, as needed or desired, and the physical ports may further provide various virtual links as needed or desired. TOR switch 110 is illustrated as providing a 400 gigabits per second (Gbps) data transfer bandwidth for upload and download to blade server 120 in a normal operating condition. As noted above, this normal bandwidth may be provided by one or more physical connections between TOR switch 110 and chassis I/O module 122, as needed or desired. Chassis I/O module 122 is illustrated as including a bandwidth allocation table 123 that controls the bandwidth allocation to each of blade servers 124. In the normal operating condition, the bandwidth is divided evenly between each of blade servers 124, such that each blade server is allocated a bandwidth of 50 Gbps.

Blade server 120 further includes a baseboard management controller (BMC) 126. BMC 126 represents one or more processing devices, such as a dedicated BMC System-on-a-Chip (SoC) device and one or more additional devices, as needed or desired. BMC 126 provides an out-of-band (OOB) mechanism to monitor, manage, and maintain blade server 120, such as by providing BIOS/UEFI or system firmware updates, managing non-processing components of the blade server, such as system cooling fans and power supplies, and monitoring, managing, and maintaining the operating environments instantiated on server blades 124.

BMC 126 is connected to chassis I/O module 122 by a management interface. Such a management interface may include a two-wire interface such as an inter-integrated circuit (12) interface, an improved inter-integrated circuit (13) interface, or the like, or may include a virtual a virtual local area network (VLAN) established utilizing a network controller sideband interface (NC-SI) or another management protocol, as needed or desired. The management interface implements a management protocol, such as an Intelligent Platform Management Interface (IPMI) interface. In particular, BMC 126 may instantiate a fabric resource director (FReD) that provides an ACPI application programming interface (API) that interacts with an input/output module daemon (IOMD) instantiated on chassis I/O module 122 to monitor, manage, and maintain the network connectivity between the chassis I/O module and TOR switch 110, and between the chassis I/O module and server blades 124. The FRED may issue data requests, or control information to IOMD utilizing a standardized data format, such as in a JSON format, as needed or desired. BMC 126 may further be connected to each one of blade servers 124 by a management interface, as needed or desired. The details of BMC communication with managed devices, the monitoring, management, and maintenance of the managed devices, and protocols for the monitoring, management, and maintenance of managed devices are known in that and will not be further described herein, except as may be needed to illustrate the current embodiments.

BMC 126 is illustrated as including a server priority table 127 that tabulates a current priority level for each of blade servers 124. In a particular embodiment, server priority table 127 operates to confer the priority level upon each one of blade servers 124. A management system for the datacenter, such as a Dell Open Mange Enterprise Module (OME-M), may provide the priority allocations to BMC 126, and the BMC may operate to populate server priority table 127 with the received allocations, and my further communicate the priorities to the associated server blades 124, such as to a blade-level management controller. BMC 126 includes a port bandwidth control engine (PBCE) 128, described further below.

In another embodiment, BMC 126 may retrieve the priority allocations from blade servers 124 themselves. Each of blade servers 124 may have one or more workload instantiated thereon, and the workloads may each be associated with a particular priority level, or a management system for the datacenter may assign the priorities to the blade server workloads, as needed or desired. In this embodiment, a blade-level management controller can communicate the priority level associated with the particular blade server 124 to BMC 126, as needed or desired. As illustrated, server priority table 127 includes two (2) priority levels: a "high" priority level, and a "low" priority level. However the teachings of the current disclosure are not limited to the implementation of only two (2) priority levels, and three (3) or more priority levels may be implemented in a priority allocation table, as needed or desired.

PBCE 128 operates to monitor the priority levels of server blades 124 and the bandwidth between TOR switch 110 and chassis I/O module 122, to determine a per-server-blade bandwidth allocation of the bandwidth between the TOR switch and the chassis I/O module, and implements the per-server-blade bandwidth allocation on the chassis I/O module. In monitoring the priority levels of server blades 124, PBCE 128 accesses server priority table 127 to determine the established priority for each of blade servers 124, as described above.

In monitoring the bandwidth between TOR switch 110 and chassis I/O module 122, PBCE 128 collects data from the chassis I/O module, and from operating information provided by blade servers 124 and BMC 126. The operating information may include a total number of active (i.e., powered on) server blades 124, the total upstream bandwidth between TOR switch 110 and chassis I/O module 122, total upstream utilized bandwidth between the TOR switch and the chassis I/O module, server priority information, utilized bandwidth per server blade 124, total number of uplink ports, or the like.

In determining the per-server-blade bandwidth allocation of the bandwidth between TOR switch 110 and chassis I/O module 122, PBCE 128 determines if the total available bandwidth between the TOR and the chassis I/O module is sufficient to meet the demand of all of server blades 124. If the total available bandwidth is sufficient, PBCE 128 takes no action to modify bandwidth allocation table 123, and the bandwidth allocation as defined by the bandwidth allocation table remains at the optimum level as shown in FIG. 1. However, if the total available bandwidth is not sufficient to meet the demand of all of server blades 124, then PBCE 128 determines a new per-server-blade bandwidth allocation, based upon each of server blades 124 priority, as provided by server priority table 127. In particular, PBCE 128 may determine that the bandwidth between TOR switch 110 and chassis I/O module 122 has been degraded. For example, one or more of the physical connections between TOR switch 110 and chassis I/O module 122 has experienced a bandwidth slowdown, has completely failed, or has otherwise become degraded.

Figure 2:
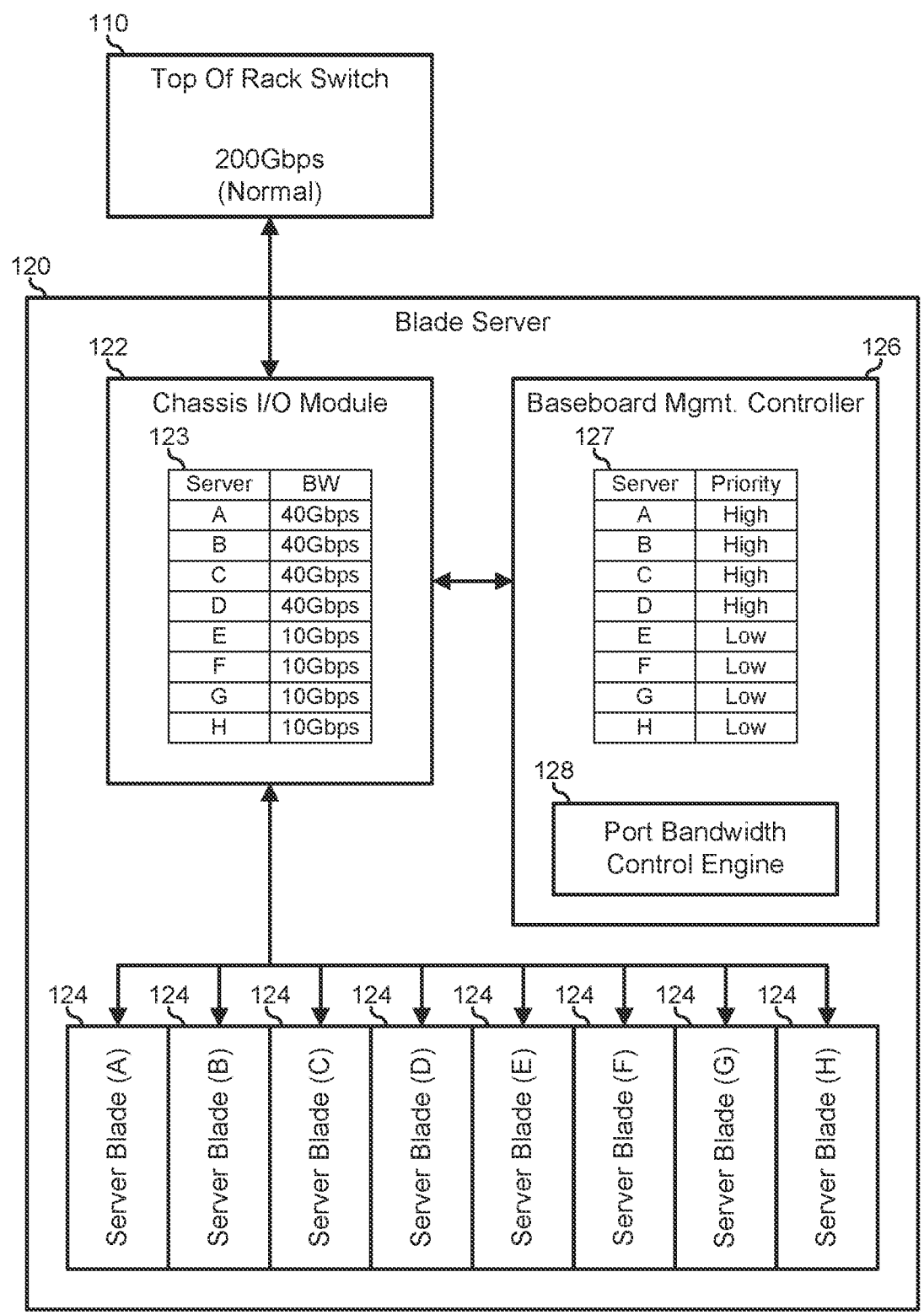

FIG. 2 illustrates a particular exemplary case for information handling system 100 where the bandwidth between TOR switch 110 and chassis I/O module 122 has degraded from 400 Gbps to 200 Gbps. In a case where a blade server does not utilize a PBCE such as PBCE 128, the chassis I/O module would typically reduce the bandwidth allocation to all of the blade servers by half, allocating 25 Gbps to each of the blade servers. However PBCE 128 operates to provide a slightly reduced bandwidth allocation to those of blade servers 124 that are indicated in server priority table 127 as having a "high" priority (for example servers A, B, C, and D), and to provide a heavily reduced bandwidth allocation to those server blades that are indicated as having a "low" priority (for example servers E, F, G, and H). For example, PBCE 128 may determine to reduce the bandwidth allocation of the "high" priority servers to 40 Gbps, and to reduce the bandwidth allocation of the "low" priority servers to 10 Gbps.

In a particular case, a high priority server blade may be defined as having a particular minimum bandwidth allocation to which PBCE 128 operates to create the bandwidth allocation. For example, a high priority server blade may be defined as having a minimum bandwidth allocation of 25 Gbps. In a case where the bandwidth between TOR 110 and chassis I/O module 122 drops to 100 Gbps, PBCE 128 may allocate all of the available bandwidth to the high priority server blades, leaving no available bandwidth for the low priority server blades. In such a case, PBCE 128 may implement a quality-of-service (QOS) type model to provide any un-utilized bandwidth to the low priority server blades, for example, on a round-robin basis. In an alternative case, PBCE 128 may operate to violate the minimum bandwidth for the high priority servers in order to provide a de minimus bandwidth allocation to the low priority server blades. For example, PBCE 128 may provide a 24 Gbps bandwidth allocation to the high priority server blades in order to provide a one (1) Gbps bandwidth allocation to the low priority server blades.

Other schemes for handling greatly reduced bandwidth allocations may be utilized by PBCE 128, as needed or desired. For example, PBCE 128 may track in real time the utilized bandwidth per server blade 128. Then, if a particular high priority server blade is determined to be routinely utilizing less than its allocated bandwidth, PBCE 128 can operate to scavenge a portion of the unused bandwidth of the particular server blade to temporarily increase the bandwidth allocation to one or more of the other server blades, as needed or desired. As regards the determination of the per-server-blade bandwidth allocation, PBCE 128 operates continuously to optimize the bandwidth allocation based upon the current status of the bandwidth between TOR switch 110 and chassis I/O module 122, tracking both decreases and increases in the bandwidth. In particular, when the bandwidth is restored to the original (normal) operating condition, PBCE 128 will restore the original bandwidth allocation as illustrated in FIG. 1.

In implementing the per-server-blade bandwidth allocation on chassis I/O module 128, PBCE 128 operates to communicate the determined bandwidth allocation, as described above, to the chassis I/O module, and the chassis I/O module will adjust the bandwidth of the blade server facing ports accordingly.

Figure 3:
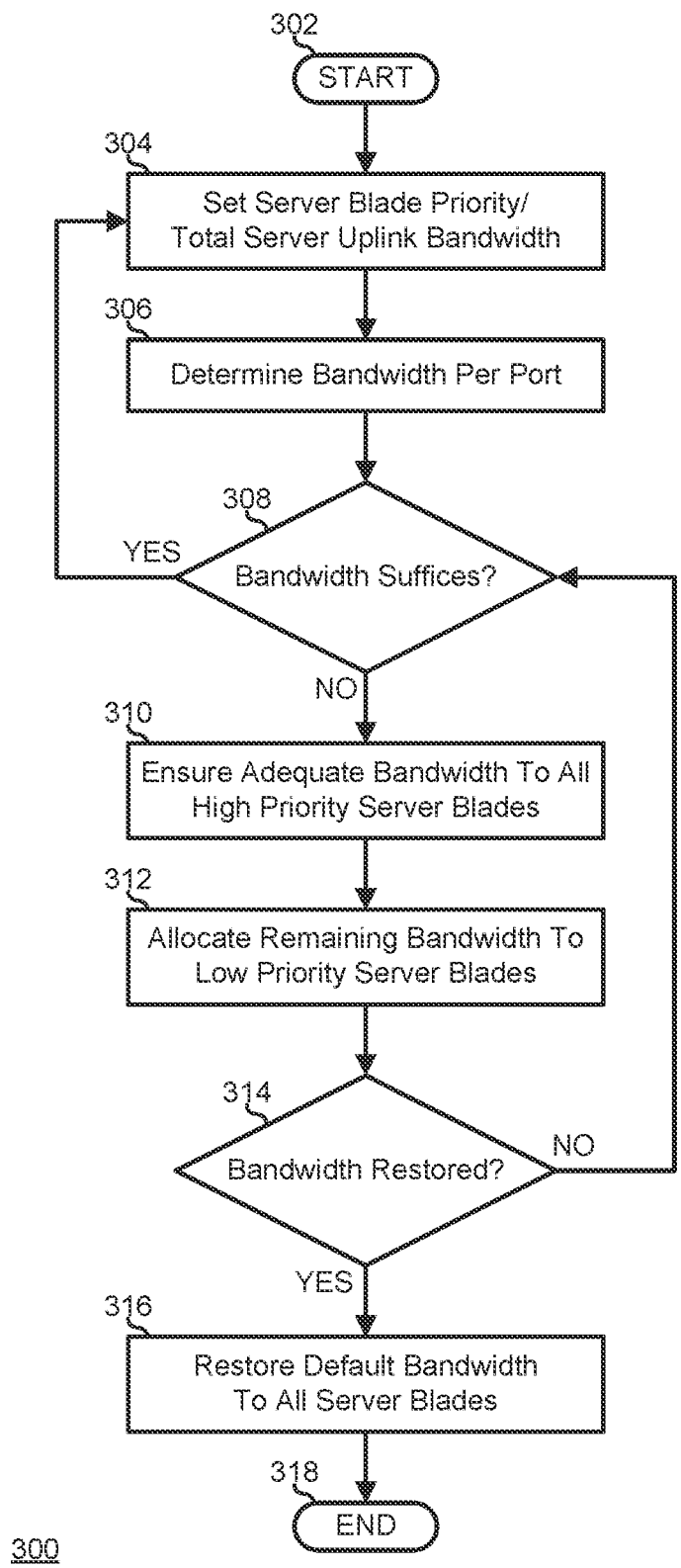
FIG. 3 is a flowchart illustrating a method for the dynamic configuration of blade server network port bandwidth based on server blade priority according to an embodiment of the current disclosure.

FIG. 3 illustrates a method 300 for the dynamic configuration of blade server network port bandwidth based on server blade priority, starting at block 302. The server blade priority for each server blade in a blade server is set, and the total uplink capacity between a chassis I/O module of the blade server and a TOR switch is determined in block 304. Block 304 may further represent the provision of other settings or the determination of other information. For example, a PBCE may determine a total number of active (i.e., powered on) server blades, the total upstream utilized bandwidth between the TOR switch and the chassis I/O module, the total number of uplink ports, or the like. The total utilized bandwidth per server blade is determined by the PBCE in block 306. A decision is made as to whether or not the uplink bandwidth suffices to provide all server blades with adequate bandwidth in decision block 308. If so, the "YES" branch of decision block 308 is taken and the method returns to block 304, where the server blade priority is set and the total uplink capacity is determined.

If the uplink bandwidth is not sufficient to provide all server blades with adequate bandwidth, the "NO" branch of decision block 308 is taken and a bandwidth allocation is provided for the high priority server blades that ensures adequate bandwidth to the high priority server blades in block 310. An analysis of the bandwidth requirements for all ports and blade servers may be necessary in order to provide the bandwidth allocation. Such an analysis may be provided in response to taking the "NO" branch of decision block 308, or may be provided in conjunction with the determination of the total utilized bandwidth per blade server, as provided in block 306. The bandwidth allocation is extended to the low priority server blades in block 312. The allocation of bandwidth to the low priority server blades may include an analysis of any remaining bandwidth after the high priority blade server bandwidth allocation, as needed or desired. A decision is made as to whether or not the original bandwidth has been restored in decision block 314. The decision of decision block 314 may be understood as determining whether or not a full restoration of the original bandwidth has occurred, or whether the current uplink bandwidth has otherwise changed or remained the same as when the "NO" branch of decision block 308 was taken.

If the original bandwidth has not been restored, or has changed to some value other than the original uplink bandwidth, the "NO" branch of decision block 314 is taken and the method returns to decision block 308 where the determination is made as to whether or not the new uplink bandwidth is sufficient to provide all server blades with adequate bandwidth. If the original bandwidth has been fully restored, the "YES" branch of decision block 314 is taken, the default, or original, bandwidth allocation is restored to all server blades in block 316, and the method ends in block 318.

Figure 4:
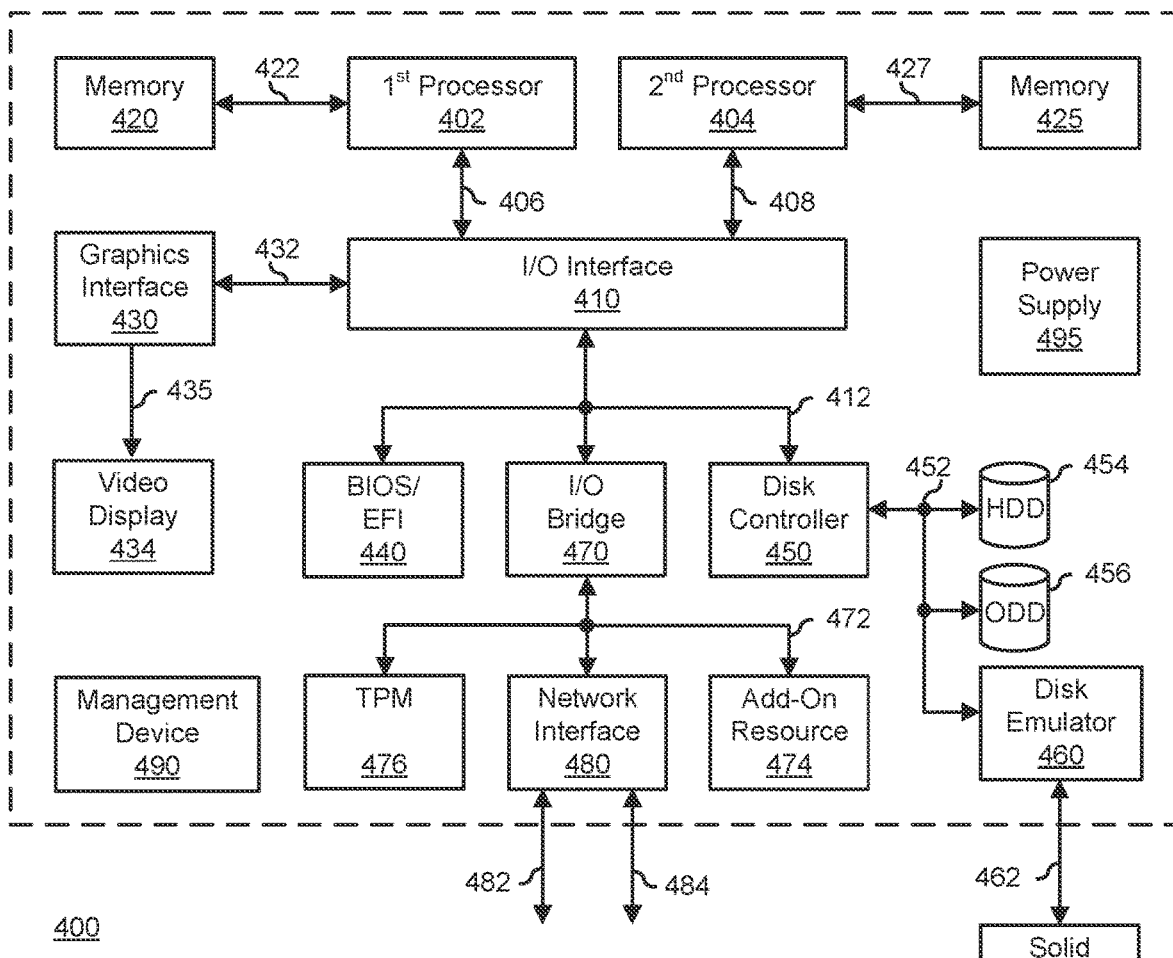
FIG. 4 is a block diagram illustrating a generalized information handling system according to another embodiment of the present disclosure.

FIG. 4 illustrates a generalized embodiment of an information handling system 400. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below, and operates to perform one or more of the methods described below. Information handling system 400 includes processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an I/O bridge 470, one or more add-on resources 474, a trusted platform module (TPM) 476, a network interface 480, a management device 490, and a power supply 495. Processors 402 and 404, I/O interface 410, memory 420 and 425, graphics interface 430, BIOS/UEFI module 440, disk controller 450, HDD 454, ODD 456, disk emulator 460, SSD 462, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432, and provides a video display output 435 to a video display 434. In a particular embodiment, information handling system 400 includes separate memories that are dedicated to each of processors 402 and 404 via separate memory interfaces. An example of memories 420 and 425 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412, or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on a separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400. Management device 490 can operate off of a separate power plane from the components of the host environment so that the management device receives power to manage information handling system 400 when the information handling system is otherwise shut down. An example of management device 490 includes a commercially available BMC product or other device that operates in accordance with an Intelligent Platform Management Initiative (IPMI) specification, a Web Services Management (WS-Man) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
a top-of-rack (TOR) switch; and
a blade server including:
a plurality of processing blades, each processing blade having a priority level of one of at least a high priority level and a low priority level;
an input/output (I/O) device configured to be coupled to the TOR switch and including a plurality of network ports, each processing blade being coupled to one of the network ports; and
a port bandwidth control engine configured to determine, in a normal operating condition, that the TOR switch is providing a maximum bandwidth to the I/O device, and in response to allocate the maximum bandwidth equally to each one of the processing blades, and to determine, in a first reduced operating condition, that the TOR switch is providing a first reduced bandwidth to the I/O device, the first reduced bandwidth being less than the maximum bandwidth, and in response to allocate to each high priority level processing blade a first bandwidth on the associated network port and to allocate to each low priority level processing blade a second bandwidth on the associated network port, the first bandwidth being greater than the second bandwidth.

2. The information handling system of claim 1, wherein, in allocating to each high priority level processing blade the first bandwidth, the port bandwidth control engine is further configured to determine a total number of powered on processing blades on the information handling system.

3. The information handling system of claim 2, wherein, in allocating to each high priority level processing blade the first bandwidth, the port bandwidth control engine is further configured to determine a utilized bandwidth per processing blade.

4. The information handling system of claim 1, wherein the port bandwidth control engine is further configured to determine, in a second reduced operating condition, that the TOR switch is providing a second reduced bandwidth to the I/O device, the second reduced bandwidth being less than the first reduced bandwidth, and, in response, to allocate to each high priority level processing blade a third bandwidth on the associated network port and to allocate to each low priority level processing blade a fourth bandwidth on the associated network port, the third bandwidth being greater than the fourth bandwidth.

5. The information handling system of claim 1, wherein, subsequent to determining that the TOR switch is providing the first reduced bandwidth to the I/O device, the port bandwidth control engine is further configured to determine, that the TOR switch is providing the maximum bandwidth to the I/O device, and in response, to reallocate the maximum bandwidth equally to each one of the processing blades.

6. The information handling system of claim 1, further comprising a baseboard management controller configured to instantiate a processing blade priority table, wherein the port bandwidth control engine determines the high priority level processing nodes and the low priority processing nodes based upon the processing node priority table.

7. The information handling system of claim 6, wherein the port bandwidth control engine is instantiated on the baseboard management controller.

8. The information handling system of claim 7, wherein the I/O device is further configured to instantiate a processing node bandwidth allocation table.

9. The information handling system of claim 8, wherein, in allocating to each high priority level processing blade the first bandwidth and to each low priority level processing node the second bandwidth, the port bandwidth control engine is further configured to populate entries of the processing node bandwidth allocation table based on the processing node priority table.

10. The information handling system of claim 1, wherein each processing blade has a priority level of one of the high priority level, a medium priority level, and the low priority level.

11. A method, comprising:
ascribing, to each of a plurality of processing blades of a blade server of an information handling system, a priority level of one of a high priority level and a low priority level;
coupling an input/output (I/O) device of the blade server to a top-of-rack (TOR) switch of the information handling system;
coupling each of the processing blades to one of a plurality of network ports of the I/O device;
determining, in a normal operating condition, by a port bandwidth control engine, that the TOR switch is providing a maximum bandwidth to the I/O device;
allocating the maximum bandwidth equally to each one of the processing blade in response to determining that the TOR switch is providing the maximum bandwidth;
determining, in a first reduced operating condition, that the TOR switch is providing a first reduced bandwidth to the I/O device, the first reduced bandwidth being less than the maximum bandwidth; and
in response to determining that the TOR switch is providing the first reduced bandwidth:
allocating to each high priority level processing blade a first bandwidth on the associated network port; and
allocating to each low priority level processing blade a second bandwidth on the associated network port, the first bandwidth being greater than the second bandwidth.

12. The method of claim 11, wherein, in allocating to each high priority level processing blade the first bandwidth, the method further comprises determining a total number of powered on processing blades on the information handling system.

13. The method of claim 12, wherein, in allocating to each high priority level processing blade the first bandwidth, the method further comprises determining a utilized bandwidth per processing blade.

14. The method of claim 11, further comprising:
  determining, in a second reduced operating condition, that the TOR switch is providing a second reduced bandwidth to the I/O device, the second reduced bandwidth being less than the first reduced bandwidth; and
  in response to determining that the TOR switch is providing the second reduced bandwidth:
    allocating to each high priority level processing blade a third bandwidth on the associated network port; and
    allocating to each low priority level processing blade a fourth bandwidth on the associated network port, the third bandwidth being greater than the fourth bandwidth.

15. The method of claim 11 wherein subsequent to determining that the TOR switch is providing the first reduced bandwidth to the I/O device, the method further comprises:
  determining, that the TOR switch is providing the maximum bandwidth to the I/O device; and
  reallocating the maximum bandwidth equally to each one of the processing blades.

16. The method of claim 11, further comprising instantiating, on a baseboard management controller of the information handling system, a processing blade priority table, wherein determining the high priority level processing nodes and the low priority processing nodes is based upon the processing node priority table.

17. The method of claim 16, further comprising instantiating the port bandwidth control engine on the baseboard management controller.

18. The method of claim 17, further comprising instantiating, on the I/O device, a processing node bandwidth allocation table.

19. The method of claim 18 wherein in allocating to each high priority level processing blade the first bandwidth and to each low priority level processing node the second bandwidth, the method further comprises populating entries of the processing node bandwidth allocation table based on the processing node priority table.

20. An information handling system, comprising:
  a top-of-rack (TOR) switch; and
  a blade server including:
    a plurality of processing blades, each processing blade being ascribed a priority level of one of at least a high priority level and a low priority level;
    an input/output (I/O) device configured to be coupled to a network device external to the information handling system and including a plurality of network ports, each processing blade being coupled to one of the network ports;
    a port bandwidth control engine configured to determine a total number of powered on processing blades on the information handling system, to determine, in a normal operating condition, that the TOR switch is providing a maximum bandwidth to the I/O device, and in response to allocate the maximum bandwidth equally to each one of the processing blades based on the total number of powered on processing nodes, and to determine, in a first reduced operating condition, that the TOR switch is providing a first reduced bandwidth to the I/O device, the first reduced bandwidth being less than the maximum bandwidth, and in response to allocate to each high priority level processing blade a first bandwidth on the associated network port and to allocate to each low priority level processing blade a second bandwidth on the associated network port, the first bandwidth being greater than the second bandwidth; and
    a baseboard management controller configured to instantiate a processing blade priority table, wherein the port bandwidth control engine determines the high priority level processing nodes and the low priority processing nodes based upon the processing node priority table.

* * * * *